US006814257B2

(12) United States Patent
Kiene et al.

(10) Patent No.: US 6,814,257 B2
(45) Date of Patent: Nov. 9, 2004

(54) DELIVERY DEVICE FOR CASSETTES AND/OR SPECIMEN SLIDES FOR HISTOLOGICAL PREPARATIONS IN A PRINTING SYSTEM

(75) Inventors: Uwe Kiene, Eppelheim (DE); Andreas Laudat, Meckesheim (DE); Holger Metzner, Nussloch (DE); Manfred Biehl, Meckesheim (DE); Roland Walter, Neulussheim (DE); Bernd Guenther, Neidenstein (DE)

(73) Assignee: Leica Microsystems Nussloch GmbH, Nussloch (DE)

( * ) Notice: Subject to any disclaimer, the term of this patent is extended or adjusted under 35 U.S.C. 154(b) by 168 days.

(21) Appl. No.: 10/208,505

(22) Filed: Jul. 30, 2002

(65) Prior Publication Data

US 2003/0059281 A1 Mar. 27, 2003

(30) Foreign Application Priority Data

Sep. 6, 2001 (DE) .......................................... 101 43 802

(51) Int. Cl.$^7$ ............................................... B65G 59/00
(52) U.S. Cl. ........................ 221/114; 221/123; 221/133
(58) Field of Search ................................ 221/112, 114, 221/123, 133, 270, 274, 292

(56) References Cited

U.S. PATENT DOCUMENTS

| 3,056,529 A | * | 10/1962 | De Shon et al. ............... 221/15 |
| 3,095,114 A | * | 6/1963 | Tobias ........................ 221/114 |
| 6,126,036 A | * | 10/2000 | d'Alayer de Costemore d'Arc et al. .......................... 221/253 |
| 2002/0125166 A1 | * | 9/2002 | Laudat ........................ 206/460 |
| 2002/0167577 A1 | * | 11/2002 | Kiene et al. ................. 347/102 |

FOREIGN PATENT DOCUMENTS

| DE | 201 04 158 U 1 | 9/2001 |
| GB | 2 235 163 A | 2/1991 |
| GB | 2 308 841 A | 7/1997 |

* cited by examiner

Primary Examiner—David H. Bollinger
(74) Attorney, Agent, or Firm—Hodgson Russ LLP (57) ABSTRACT

A delivery device (5) for cassettes and/or specimen slides for histological preparations in a printing system (11) is described. The cassettes and/or specimen slides are in each case arranged one above another in stack magazines (6), a control device (1) being provided for removal of a cassette and/or specimen slide from the stack magazines (6). The improvement comprises a drive shaft (12) having a motor (13) for at least two stack magazines (6), and the motor (13) is connected to the control device (1).

42 Claims, 5 Drawing Sheets

DELIVERY DEVICE FOR CASSETTES AND/OR SPECIMEN SLIDES FOR HISTOLOGICAL PREPARATIONS IN A PRINTING SYSTEM

CROSS REFERENCE TO RELATED APPLICATIONS

This application claims priority of the German patent application 101 43 802.8 filed Sep. 6, 2001 which is incorporated by reference herein.

FIELD OF THE INVENTION

The invention concerns a delivery device for cassettes and/or specimen slides for histological preparations in an automated printing system.

BACKGROUND OF THE INVENTION

GB 2 235 163 A discloses a plotter for plastic cassettes in which labeling is accomplished via a thermal method using a heatable plotter pin and a carbon ribbon. Here the plastic cassettes are arranged in a stack magazine and can be delivered individually to the printer via a detent pawl. A further exemplary embodiment here shows a stack magazine, having a stack of glass specimen slides, in which the specimen slides can be removed individually. A disadvantage here is that only a single stack magazine is provided in the printer, and the printer can imprint only plastic cassettes or only specimen slides. Selectable imprinting of cassettes and/or specimen slides is not possible.

A further material delivery device for cassettes is known from GB 2 308 841 A, in which cassettes arranged one above another are arranged in a stack magazine. Individual cassettes can be released from the stack magazine by way of a rotatably mounted release device. Here again, only a single stack magazine is depicted. The use of specimen slides is not possible here.

A printing system for imprinting cassettes and/or specimen slides for histological preparations is known from previously unpublished DE 101 15 065, which corresponds to commonly owned U.S. patent application Ser. No. 10/106,159 filed Mar. 26, 2002. The system depicted and described therein comprises a material delivery device having multiple stack magazines, as well as a printing device and a drying device. The stack magazines are configured to receive cassettes arranged one above another and/or glass specimen slides. A cassette stack that can be introduced into the stack magazine is depicted and described, for example, in DE 201 04 158, which corresponds to commonly owned U.S. patent application Ser. No. 10/093,312 filed Mar. 7, 2002.

The printing system depicted and described in DE 101 15 065 has proven successful because it comprises multiple individually loadable stack magazines. As a result, both cassettes and specimen slides can be stockpiled simultaneously and delivered selectably to the printing device. In practice, colored cassettes and/or specimen slides having a corresponding color code are often used. This color code is used to identify a specific staining method or a specific type of tissue. By arranging multiple stack magazines it is thus possible to arrange differently colored cassettes, and/or specimen slides labeled in different colors, in the individual stack magazines.

SUMMARY OF THE INVENTION

It is the object of the present invention to create a simply constructed delivery device for a printer having multiple stack magazines which allows the cassettes and/or specimen slides arranged in the stack magazines to be released individually under the control of a control device.

According to the present invention, this object is achieved by a delivery device that comprises a drive shaft associated with at least two of the stack magazines, and a motor connected to the control device and to the drive shaft for rotating the drive shaft. Advantageous developments of the invention are described herein.

The delivery device for cassettes and/or specimen slides is characterized in that a drive shaft for at least two stack magazines is provided, and this drive shaft is driven by a motor connected to a control device.

Provision is made for the drive shaft to have an entrainment disk for each stack magazine, the entrainment disks being arranged at an offset from one another on the drive shaft for identification and individual control. The result of this is that depending on the position of the motor or the drive shaft, exactly one stack magazine can be selected by way of the entrainment disk.

In a further embodiment of the invention, the entrainment disk is divided into an outer and an inner disk, the inner disk being immovably joined to the drive shaft. A lever mechanism, with which an individual cassette or an individual specimen slide can be released out of the stack magazines, is arranged on the outer disk.

The inner and outer disks are constructed in the manner of a freewheel, the inner disk having a recess and a leaf spring being arranged on the outer disk.

In a further embodiment of the invention, the one end of the leaf spring is joined immovably to the outer disk, and the other end of the leaf spring projects into the recess of the inner disk.

In a preferred embodiment, the freewheel is configured such that in the one rotation direction of the drive shaft, the leaf spring jumps over the recess upon rotation; and in the other rotation direction of the drive shaft, a positively fitting connection is created between the outer and inner disk by engagement of the leaf spring into the recess.

The outer entrainment disk carries a lever that is connected via a reversing linkage to a slider for ejecting a specimen slide or a cassette from the stack magazine.

Provision can be made, in this context, for the slider to be adapted in its configuration to the shape of the specimen slide or the shape of the cassette.

In a further embodiment of the invention, the drive motor is embodied as a stepping motor. As a result is it also possible, in order to recognize the position of the drive shaft, to provide only a single triggering tab, joined to the drive shaft, which when the drive shaft is in one position engages into an immovably arranged light barrier and thus signals a specific position, in this case the zero position, of the drive shaft.

In a development of the invention, the control device is connected to the light barrier, the signal of the light barrier being automatically recognized by the control device as the zero position. Stored rotational positions of the drive motor can then be activated by way of the control device. These rotational positions of the drive shaft or of the drive motor correspond to the individual entrainment disks arranged at an offset on the drive shaft. The angles at which the entrainment disks are arranged with respect to one another on the drive shaft are immaterial. All that is necessary is to ensure that only a single effective spring/recess connection can be created at any one time.

In a further embodiment of the invention, the reversing linkage or the outer disk comprises a spring for resetting the slider after an ejection of the specimen slide or cassette from the stack magazine has occurred. This ensures that after the spring/recess connection has been abolished, a reset of the reversing linkage and of the slider is accomplished between the inner and the outer entrainment disk.

For protection from powdered glass, the spring can advantageously be embodied in encapsulated fashion.

In a further embodiment of the invention, the glass specimen slide stacks arranged in the stack magazines are carried by hardened components. This has the advantage that no material abrasion occurs on the delivery device as a result of the very hard glass specimen slides.

For that purpose, provision can be made for the slider to comprise at least two slider rods, arranged next to one another, made of a hardened material.

It has proven to be advantageous if the stack of glass specimen slides arranged one above another rests on at least two stack rods, arranged next to one another, made of hardened material.

In a further embodiment of the invention and for reliable pushing of an individual glass specimen slide out of its stack, the height difference between the upper edge of the stack rods and the upper edge of the slider rods is equal to no more than the glass thickness of a specimen slide.

Hardened rods of this kind are not required for plastic cassettes. Here as well, however, the height difference between the upper edge of the stack support and the upper edge of the slider support is less than the cassette height.

The delivery device can also be equipped with a chute for delivering the specimen slides and/or cassettes into a lower transfer position of the downstream printing device. It has proven to be advantageous in this context if the chute has a hardened surface. This reliably prevents material abrasion on the chute because of the hard glass specimen slides. hardened surface. This reliably prevents material abrasion on the chute because of the hard glass specimen slides.

To ensure that the glass specimen slides can reliably slide along on the chute, the surface of the chute is equipped with a corrugated profile so that a flat glass specimen slide rests on the chute in only linear fashion, and an air cushion is thus formed between the specimen slide and the surface of the chute. This prevents "stick-slipping" of the specimen slide on the chute.

In a further embodiment of the invention, hardened track rollers with which the specimen slide is tilted into the lower transfer position are arranged at the end of the chute. For that purpose, the surface of the track rollers is arranged higher than the surface of the chute.

In addition, provision can be made for arranging at the end of the chute a sensor to detect a specimen slide and/or a cassette, and for connecting the sensor to the control device. When the sensor responds, a signal is generated by the control device to deliver the specimen slide or cassette into the printing device. A response by the sensor also means detection of the fact that the selected stack magazine still contains cassettes or specimen slides. Sensor monitoring for each individual stack magazine can thus be omitted.

In a further embodiment of the invention, if the sensor does not respond, a signal is generated by the control device to switch over to a different stack magazine, and the drive motor is controlled accordingly. At the same time, an acoustic and/or optical signal to refill the stack magazine can additionally be generated.

In a further embodiment of the invention, the stack magazines and the delivery device are embodied for selectable reception of cassettes with and without integrally formed covers.

BRIEF DESCRIPTION OF THE DRAWINGS

The invention will be depicted and explained further in an exemplary embodiment, with reference to the schematic drawings in which.

DETAILED DESCRIPTION OF THE INVENTION

Figure 1:
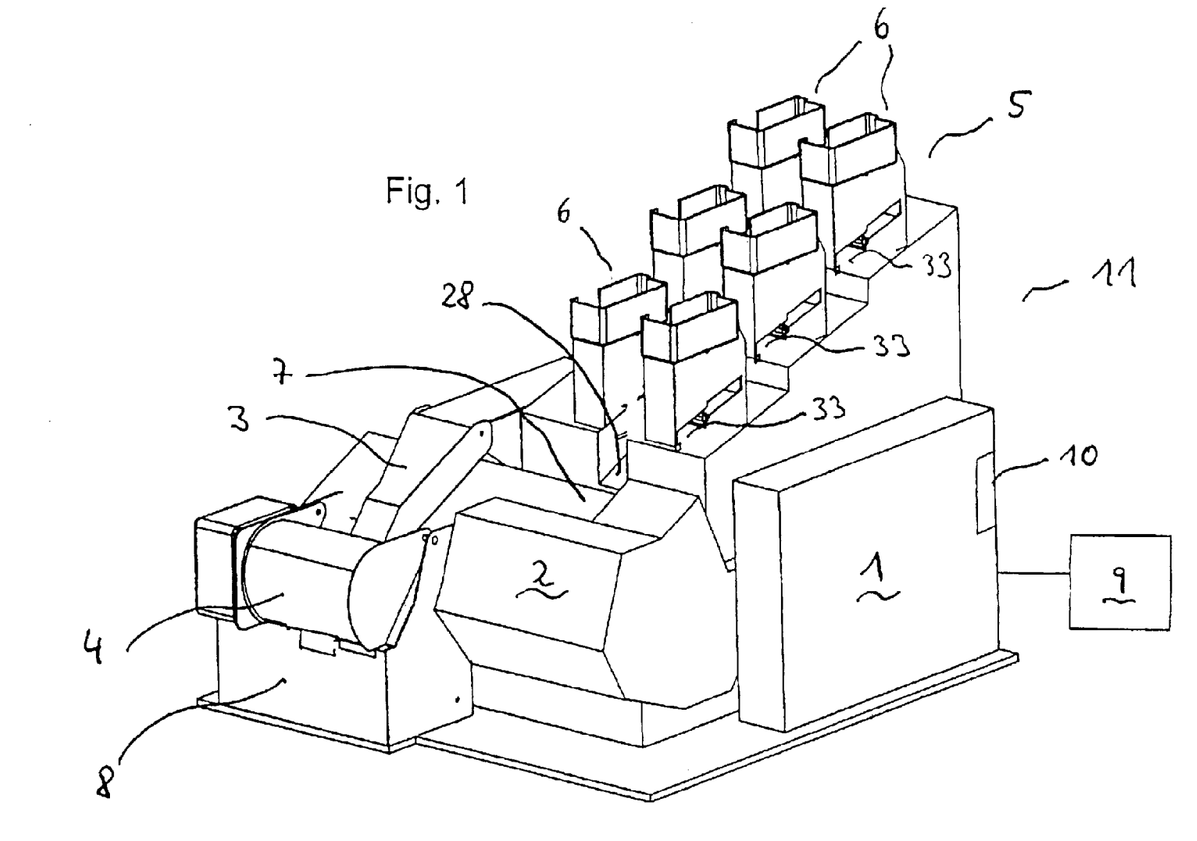
FIG. 1 shows a printing system as defined in DE 101 15 065 for imprinting glass specimen slides and/or plastic cassettes.

FIG. 1 shows a printing system 11 for imprinting plastic cassettes and/or glass specimen slides, as used for the preparation of histological samples. Printing system 11 comprises a delivery device 5 having a total of six stack magazines 6. Stack magazines 6 each sit on a receptacle 33. In each of these stack magazines 6, the specimen slides or cassettes are arranged one above another and rest on receptacle 33. Each stack magazine 6 is configured so that it can receive either cassettes or specimen slides. This delivery device 5, having a chute 28, is adjoined by a transport device 7 that conveys the cassettes or specimen slides to a printing device 2. The cassettes or specimen slides, imprinted with an inkjet printer, are then conveyed to a hot-air dryer 3. Once hot-air drying has been performed, the printed-on ink is cured with a flash device 4, and the specimen slide or cassette is conveyed to a removal device 8. A control device 1, with a connected input device 9 and an interface 10, is provided in order to control printing system 11.

Figure 2:
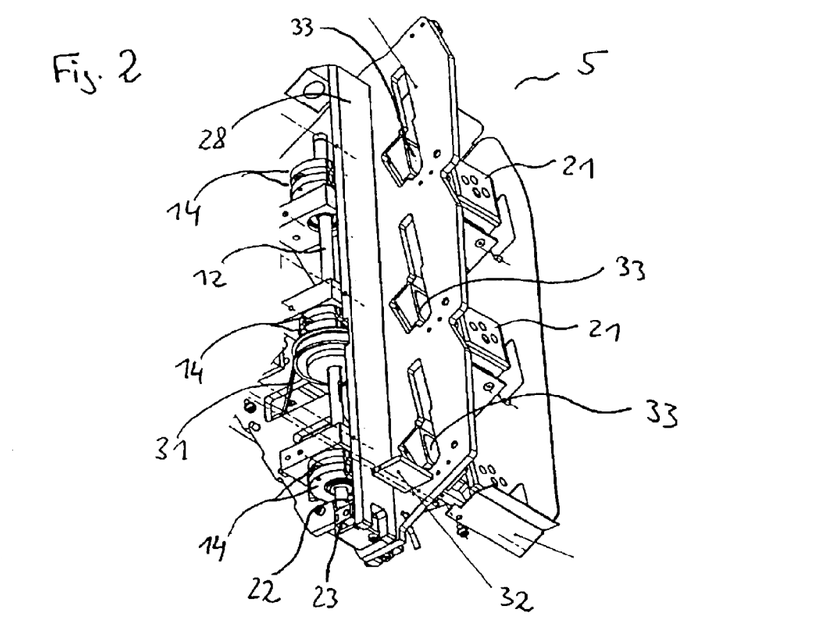
FIG. 2 is a view of the drive shaft with the entrainment disks arranged thereon.

FIG. 2 is a sectioned depiction of delivery device 5, having chute 28 and having a drive shaft 12 that is connected via a drive belt 31 to a motor 13 (not depicted here). Drive shaft 12 carries one entrainment disk 14 for each stack magazine 6 depicted in FIG. 1. Arranged at the front end of drive shaft 12 is a triggering tab 22 that engages into a light barrier 23 mounted immovably on the housing. By way of light barrier 23 and triggering tab 22, a specific position (preferably the zero position) of drive shaft 12 can be detected.

Also shown in this depiction are supports 33 for the cassettes and/or specimen slides. Associated with each support 33 is a slider 21 for pushing out a cassette and/or specimen slide.

A shutter 32, which can be actuated by an electric motor and is connected to control device 1, is arranged at the end of chute 28.

Figure 3:
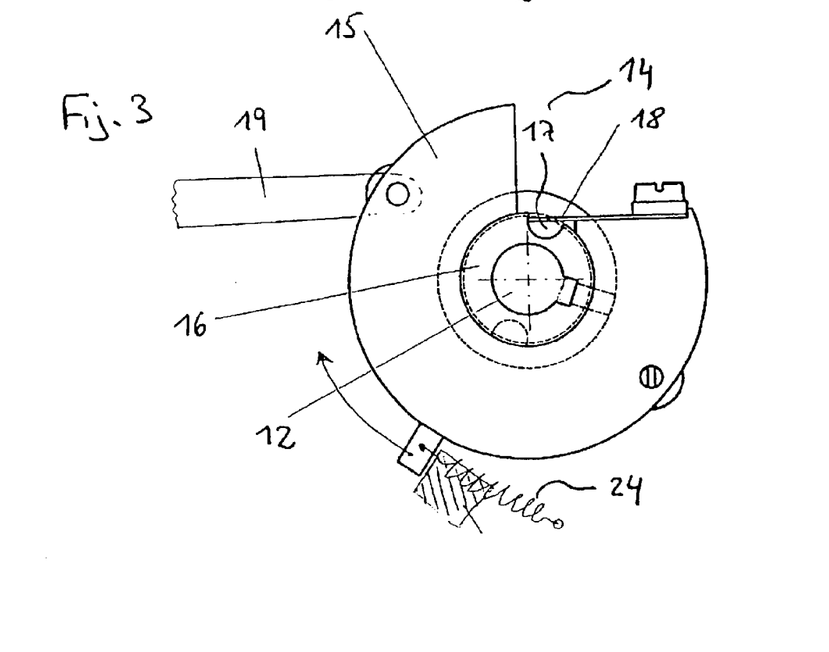
FIG. 3 is a sectioned depiction of the entrainment disk.

FIG. 3 shows entrainment disk 14 with the internally located drive shaft 12. Entrainment disk 14 is constructed in two parts and comprises an inner disk 16 that is joined nonrotatably to drive shaft 12. Inner disk 16 comprises a recess 17 into which a leaf spring 18 engages. Leaf spring 18 is immovably joined to an outer disk 15 of entrainment disk 14. A lever 19 of a reversing linkage 20 (FIG. 4) is arranged on outer disk 15. The respective slider 21 (FIG. 2) is actuated via this reversing linkage 20.

Counter-clockwise rotation of drive shaft 12 causes inner disk 16 also to be rotated. Leaf spring 18 can engage into recess 17. Leaf spring 18 is arranged with respect to recess 17, however, in such a way that in this rotation direction, spring 18 jumps over recess 17, or is lifted by the right edge of the recess back out of recess 17. Only when spring 18 engages into the recess, and the rotation direction of drive shaft 12 changes to clockwise, is the end of the leaf spring braced against the left edge of the recess and entrained there. As a result of this positively fitting connection, outer disk 15 is also moved in the clockwise direction. In the context of this motion, a spring 24 arranged on outer disk 15 is tensioned.

As a result of the motion of outer disk 15, lever 19 is also moved and slider 21 (FIG. 2) is actuated to push out a cassette or specimen slide. After pushing out occurs, the connection between spring 18 and recess 17 is abolished again by counter-clockwise rotation of drive shaft 12, and outer disk 15, along with lever 19, reversing linkage 20, and slider 21, is reset again by the force of the tensioned spring 24.

Figure 4:
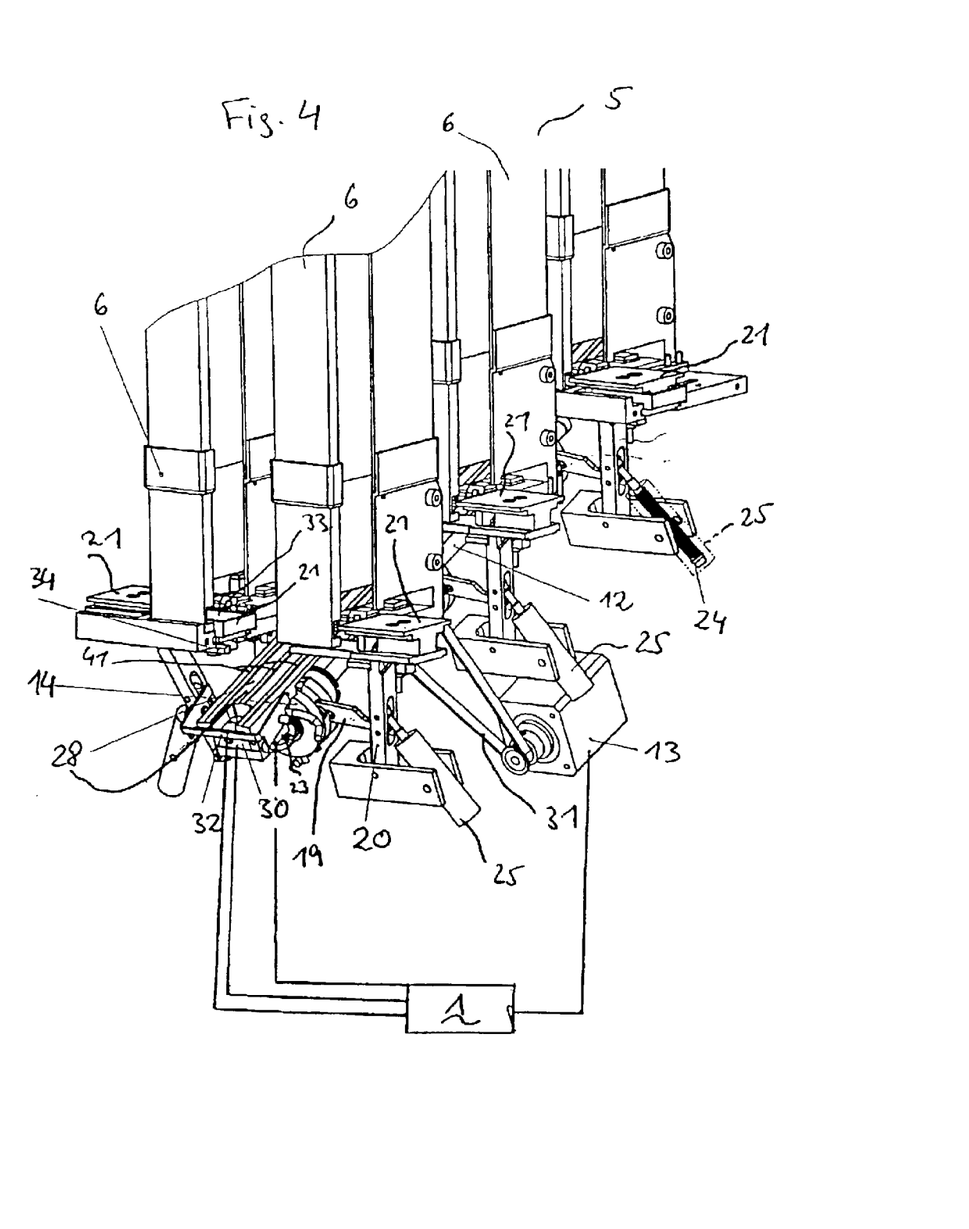
FIG. 4 is a view of the stack magazines and the slider.

FIG. 4 shows delivery device 5 with stack magazines 6, drive shaft 12, and lever 19. Lever 19 is connected to reversing linkage 20. In contrast to the exemplary embodiment of FIG. 3, compression spring 24, which is encapsulated in a housing 25, is provided on this reversing linkage 20.

Control device 1 is electrically connected to a sensor 30 and to shutter 32, light barrier 23, and drive motor 13.

Stack magazine 6 is placed onto receptacle 33. The stacks of specimen slides or cassettes rest on said receptacle 33. Arranged immovably on each slider 21, in the region of chute 28, are forks 34 located lower down. Forks 34 are also moved as slider 21 moves. When it is pushed out, the cassette or specimen slide falls onto lower forks 34. As slider 21 is pulled back, the cassette or specimen slide is wiped off forks 34 and falls onto chute 28. At the end of chute 28, the specimen slide or cassette is retained by shutter 32. Shutter 32 is released only by way of a signal of control device 1.

In this exemplary embodiment, chute 28 is equipped with slide rods 41 made of hard metal. It is also possible, however, to give the surface of chute 28 a corrugated profile and simultaneously to harden the surface.

Figure 5:
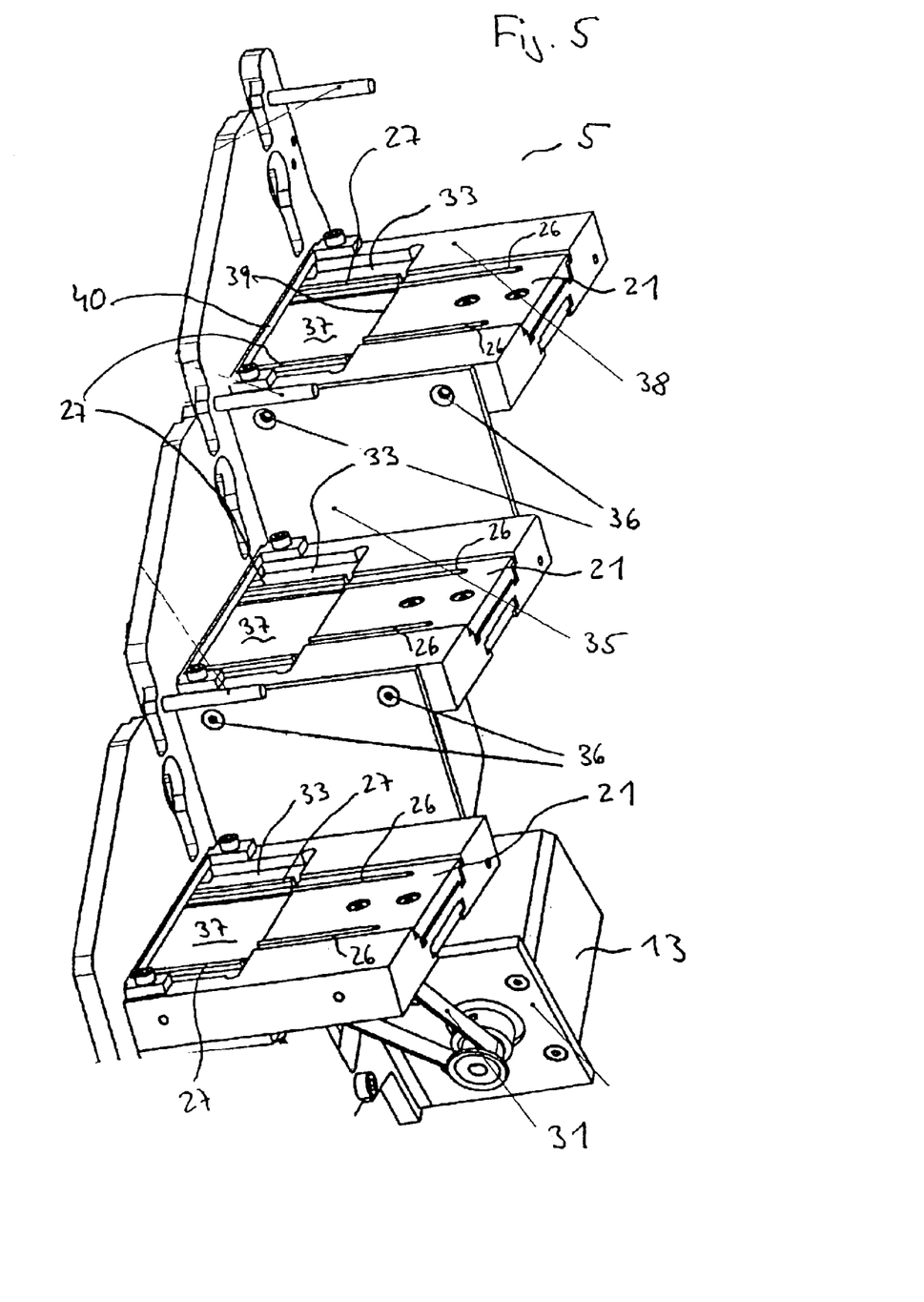
FIG. 5 is a view of the slider with the hard metal rods.

FIG. 5 shows the ejection mechanism with sliders 21 of delivery device 5. Sliders 21 are mounted in a slider frame 38 and immovably joined to a tongue 37 located lower down. In this exemplary embodiment, tongues 37 assume the function of forks 34 of FIG. 4. Slider frame 38 comprises a cutout that is configured here as receptacle 33 for the cassette stack or specimen slide stack. Receptacle 33 is arranged at a height above that of slider 21. In order to minimize material abrasion due to the very hard glass specimen slides, each receptacle 33 comprises two stack rods 27 made of hard metal, arranged parallel to one another, on which the specimen slide stack rests. Slider 21 also comprises two hard-metal slider rods 26 arranged next to one another.

When it is pushed out, the bottommost specimen slide is moved by slider edge 39 while the specimen slide above it is retained by contact edge 40. When it is pushed out, the bottommost specimen slide is moved on stack rods 27, while slider rods 26 are pushed under the remaining specimen slides. Slider rods 26 now assume the function of receptacle 33 or stack rods 27. As it is being pushed out, the pushed-out specimen slide falls off stack rods 27 onto lower tongue 37 of slider 21. Upon withdrawal of slider 21, the specimen slide is wiped off tongue 37 and falls onto chute 28.

For stability reasons, the individual stations having stack magazines 6 are joined to one another by way of side panels 35 and associated threaded joints 36.

Figure 6:
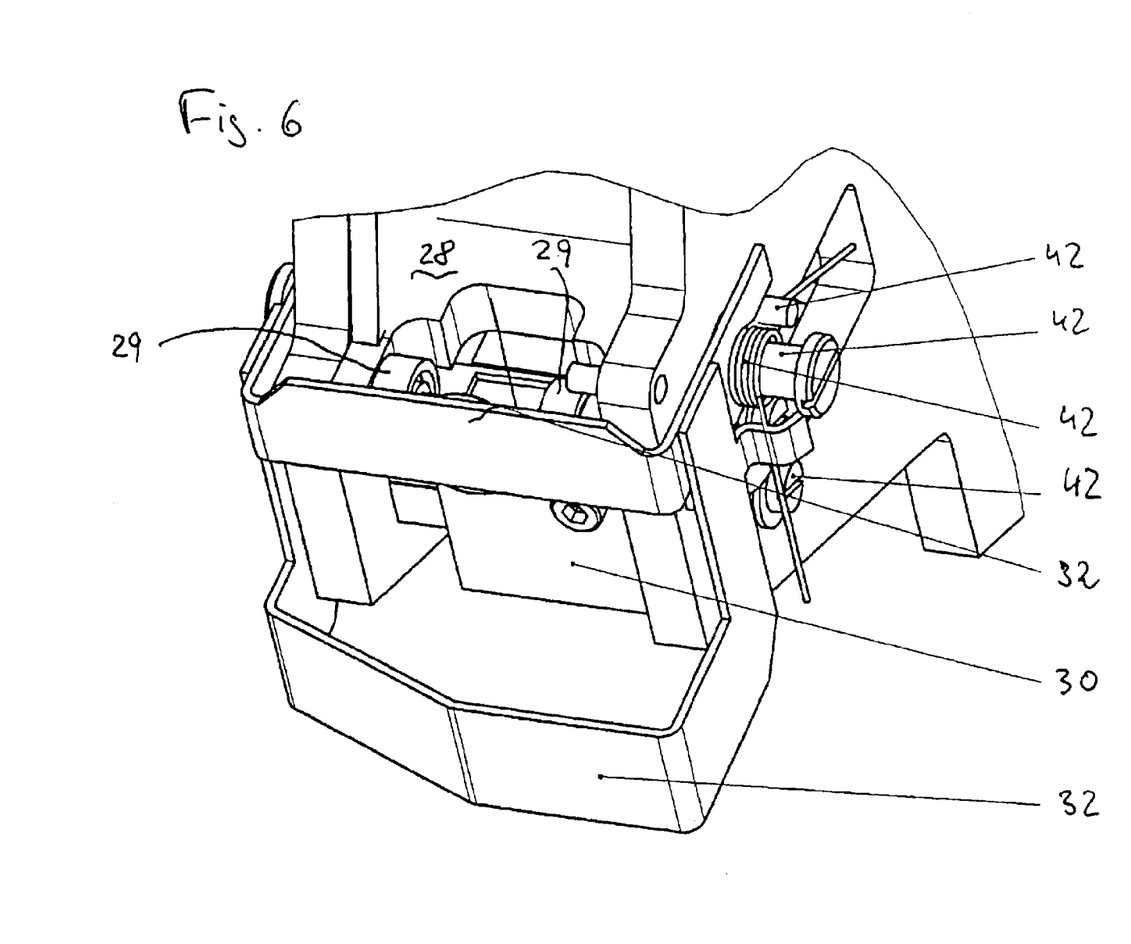
FIG. 6 is a detail view of the chute with the shutter mechanism.

FIG. 6 is a detail view of chute 28 having two track rollers 29, made of hard metal, that are arranged at the end of chute 28. After being released by shutter 32, the specimen slides are guided over track rollers 29 and delivered to the downstream transport device 7 (FIG. 1). Shutter 32 is actuated via shutter mechanism 42 and control device 1.

The invention has been described in detail with particular reference to certain preferred embodiments thereof, but it will be understood that variations and modifications can be effected within the spirit and scope of the invention.

PARTS LIST

1 Control device
2 Printing device
3 Hot-air dryer
4 Flash device
5 Delivery device
6 Stack magazine
7 Transport device
8 Removal device
9 Input device
10 Interface
11 Printing system
12 Drive shaft
13 Motor
14 Entrainment disk
15 Outer disk
16 Inner disk
17 Recess
18 Leaf spring
19 Lever
20 Reversing linkage
21 Slider
22 Triggering tab
23 Light barrier
24 Spring
25 Spring housing
26 Slider rods
27 Stack rods
28 Chute
29 Track rollers
30 Sensor
31 Drive belt
32 Shutter
33 Receptacle
34 Forks
35 Side panel
36 Threaded joint
37 Tongue
38 Slider frame
39 Slider edge
40 Contact edge
41 Slide rods
42 Shutter mechanism

What is claimed is:

1. An improvement in an apparatus for delivering cassettes and/or specimen slides for histological preparations in a printing system (11), the cassettes and/or specimen slides being in each case arranged one above another in stack magazines (6), and the apparatus having a control device (1) for removal of a cassette or a specimen slide from the stack magazines (6), wherein the improvement comprises:

a drive shaft (12);
a plurality of entrainment disks (14) mounted on the drive shaft (12), each of the plurality of entrainment disks (14) corresponding to a respective one of the stack magazines (6);
a plurality of sliders (21) corresponding one to each of the plurality of stack magazines (6) for ejecting a cassette or specimen slide from the corresponding stack magazines (6), each of said plurality of sliders (21) being operatively connected to a respective one of the plurality of entrainment disks (14); and
a motor (13) connected to the control device (1) and to the drive shaft (12) for rotating the drive shaft (12).

2. The improvement as defined in claim 1, wherein the plurality of entrainment disks (14) are arranged at an offset from one another along the drive shaft (12) for activation of different stack magazines (6).

3. The improvement as defined in claim 1, wherein each of the plurality of entrainment disks (14) is divided into an outer disk (15) and an inner disk (16), the inner disk (16) being immovably joined to the drive shaft (12).

4. The improvement as defined in claim 3, wherein the inner disk (16) includes a recess (17) and a leaf spring (18) is arranged on the outer disk.

5. The improvement as defined in claim 4, wherein one end of the leaf spring (18) is joined immovably to the outer disk (15), and the other end of the leaf spring (18) projects into the recess (17) of the inner disk (16).

6. The improvement as defined in claim 5, wherein the drive shaft has a positioning rotation direction and an opposite non-positioning rotation direction, and the leaf spring (18) is arranged such that when the drive shall (12) rotates in the positioning rotation direction, the other end of the leaf spring (18) jumps over the recess (17), and when the drive shaft (12) rotates in the non-positioning rotation direction, a positively fitting connection is created between the outer disk (15) and inner disk (16) by engagement of the other end of the leaf spring (18) into the recess (17).

7. The improvement as defined in claim 3, wherein the improvement further comprises a slider (21) for ejecting a specimen slide or cassette from an associated stack magazine (6), a lever (19) coupled to the outer disk (15), and a reversing linkage (20) through which the lever (19) is connected to the slider (21).

8. The improvement as defined in claim 7, wherein the slider (21) is adapted in its configuration to the shape of the specimen slide or the shape of the cassette.

9. The improvement as defined in claim 7, wherein either the reversing linkage (20) or the outer disk (15) comprises a spring (24) for resetting the slider (21) after an ejection of the specimen slide or cassette from the stack magazine (6) has occurred.

10. The improvement as defined in claim 9, wherein the spring (24) is encapsulated for protection flour powdered glass.

11. The improvement as defined in claim 7, further comprising a slider frame (38) in which the slider (21) is arranged.

12. The improvement as defined in claim 7, wherein the slider (21) comprises an integrally formed tongue (37) located lower down than the remainder of slider (21).

13. The improvement as defined in claim 12, wherein the tongue (37) is made of hard metal.

14. The improvement as defined in claim 12, wherein the tongue (37) has a hardened surface.

15. The improvement as defined in claim 7, wherein the slider (21) comprises two forks (34) arranged next to one another and located lower down than the remainder of slider (21).

16. The improvement as defined in claim 15, wherein the forks (34) are made of hard metal.

17. The improvement as defined in claim 15, wherein the forks (34) have a hardened surface.

18. The improvement as defined in claim 7, wherein the slider (21) comprises a slider edge (39) having a hardened surface.

19. The improvement as defined in claim 7, wherein the slider (21) comprises a slider edge (39) made of hard metal.

20. The improvement as defined in claim 1, wherein the drive motor (13) is a stepping motor.

21. The improvement as defined in claim 1, further comprising a fixed light banter (23) and a triggering tab (22) carried by the drive shaft (12), wherein the triggering tab (22) engages into the light barrier (23) when the drive shaft (12) is in a specific rotational position.

22. The improvement as defined in claim 21, wherein the control device (1) is connected to the light barrier (23), the light barrier (23) generates a signal when the drive shaft (12) is in the specific rotational position, and the signal is recognized by the control device (1) as an indication that the drive shaft (12) is in a zero position of rotation.

23. The improvement as defined in claim 21, wherein stored rotational positions of the drive motor (13) can be activated by way of the control device (1).

24. The improvement as defined in claim 1, wherein glass specimen slide stacks in stack magazines (6) are supported by hardened components.

25. The improvement as defined in claim 24, wherein the slider (21) comprises at least two slider rods (26), arranged next to one another, made of hard metal.

26. The improvement as defined in claim 25, wherein the hardened components include at least two stack rods (27), arranged next to one another, made of hard metal.

27. The improvement as defined in claim 26, wherein a height difference between an upper edge of the at least two stack rods (27) and an upper edge of the at least two slider rods (26) is equal to no more than the glass thickness of an individual specimen slide.

28. The improvement as defined in claim 1, further comprising a chute (28) for delivering the specimen slides and/or cassettes into a lower transfer position of a downstream printing device (2) to which the specimen slides and/or cassettes are delivered.

29. The improvement as defined in claim 28, wherein the chute (28) has a hardened surface.

30. The improvement as defined in claim 28, wherein the chute (28) has a surface having a corrugated profile.

31. The improvement as defined in claim 28, further comprising track rollers (29) arranged at an end of the chute (28) for tilting specimen slides and/or cassettes into the lower transfer position.

32. The improvement as defined in claim 31, wherein a surface of the track rollers (29) is arranged higher than a surface of the chute (28).

33. The improvement as defined in claim 31, wherein the track rollers (29) are made of hard metal.

34. The improvement as defined in claim 28, further comprising a sensor (30) arranged at an end of the chute (28) to detect a specimen slide and/or cassette.

35. The improvement as defined in claim 34, wherein the sensor (30) is connected to the control device (1).

36. The improvement as defined in claim 35, wherein when the control device (1) receives a signal from the sensor (30) indicating a specimen slide or cassette is detected, the control device (1) generates a signal to deliver the specimen slide or cassette into the printing device (2).

37. The improvement as defined in claim 35, wherein if the sensor (30) does not respond, a signal is generated by the control device (1) to switch over to a different stack magazine (6).

38. The improvement as defined in claim 35, wherein if the sensor (30) does not respond, a signal is generated by the control device (1) to refill the stack magazine (6).

39. The improvement as defined in claim 7, wherein the chute (28) comprises slide rods (41), arranged next to one another, as support for the cassettes and/or specimen slides.

40. The improvement as defined in claim 39, wherein the slide rods (41) are made of hard metal.

41. The improvement as defined in claim 39, wherein the slide rods (41) have a hardened surface.

42. The improvement as defined in claim 1, wherein the stack magazines (6) are configured to receive cassettes with integrally formed covers and cassettes without covers.

* * * * *